US012754298B2

(12) United States Patent
Sweeney et al.

(10) Patent No.: US 12,754,298 B2
(45) **Date of Patent: *Oct. 6, 2026**

(54) TIME-OF-FLIGHT MOTION MISALIGNMENT ARTIFACT CORRECTION

(71) Applicant: GM Cruise Holdings LLC, San Francisco, CA (US)

(72) Inventors: Glenn Sweeney, Sebastopol, CA (US); Zhanping Xu, Sunnyvale, CA (US); Brandon Seilhan, San Ramon, CA (US); Ryan Suess, Seattle, WA (US); Alexander Lesnick, Alexandria, VA (US); Kartheek Chandu, Dublin, CA (US); Ralph Spickermann, Redwood City, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 1022 days.

This patent is subject to a terminal disclaimer.

(21) Appl. No.: 17/970,518

(22) Filed: Oct. 20, 2022

(65) Prior Publication Data

US 2024/0134020 A1 Apr. 25, 2024
US 2024/0230863 A9 Jul. 11, 2024

(51) Int. Cl.
*G01S 7/497* (2006.01)
*G01S 7/4915* (2020.01)
(Continued)

(52) U.S. Cl.
CPC ............ *G01S 7/497* (2013.01); *G01S 7/4915* (2013.01); *G01S 17/58* (2013.01); *G01S 17/931* (2020.01); *G01S 17/894* (2020.01)

(58) Field of Classification Search
CPC ...... G01S 7/497; G01S 17/931; G01S 7/4915; G01S 17/58; G01S 17/894
See application file for complete search history.

(56) References Cited

U.S. PATENT DOCUMENTS

2015/0310622 A1 10/2015 Kholodenko et al.
2016/0232684 A1 8/2016 Kholodenko et al.
(Continued)

FOREIGN PATENT DOCUMENTS

WO 2024086405 A1 4/2024

OTHER PUBLICATIONS

"International Search Report and Written Opinion for PCT Patent Application No. PCT/US2023/073379", Mailed Date: Nov. 29, 2023, 15 pages.
(Continued)

*Primary Examiner* — Isam A Alsomiri
*Assistant Examiner* — Joseph C Fritchman
(74) *Attorney, Agent, or Firm* — CANTOR COLBURN LLP

(57) ABSTRACT

Various technologies described herein pertain to mitigating motion misalignment of a time-of-flight sensor system and/or generating transverse velocity estimate data utilizing the time-of-flight sensor system. A stream of frames outputted by a sensor of the time-of-flight sensor system is received. A pair of non-adjacent frames in the stream of frames is identified. Computed optical flow data is calculated based on the pair of non-adjacent frames in the stream of frames. Estimated optical flow data for at least one differing frame can be generated based on the computed optical flow data, and the at least one differing frame can be realigned based on the estimated optical flow data. Moreover, transverse velocity estimate data for an object can be generated based on the computed optical flow data.

19 Claims, 12 Drawing Sheets

(51) Int. Cl.

| | |
|---|---|
| ***G01S 17/58*** | (2006.01) |
| ***G01S 17/894*** | (2020.01) |
| ***G01S 17/931*** | (2020.01) |

(56) References Cited

U.S. PATENT DOCUMENTS

| | | | | |
|---|---|---|---|---|
| 2016/0349369 | A1 | 12/2016 | Lee et al. | |
| 2019/0154834 | A1* | 5/2019 | Heidrich | G01S 17/89 |
| 2020/0182984 | A1 | 6/2020 | Plank | |
| 2022/0046222 | A1 | 2/2022 | Meier | |
| 2023/0213635 | A1* | 7/2023 | Pazhayampallil | G01S 17/89<br>702/97 |
| 2024/0129630 | A1* | 4/2024 | Sekiguchi | G01S 7/4863 |
| 2024/0163549 | A1* | 5/2024 | Shimizu | G01S 17/36 |

OTHER PUBLICATIONS

Linder, et al., "Compensation of Motion Artifacts for Time-of-Flight Cameras", In Lecture Notes in Computer Science, vol. 5742, Jan. 1, 2009, pp. 16-27.

* cited by examiner

TIME-OF-FLIGHT MOTION MISALIGNMENT ARTIFACT CORRECTION

BACKGROUND

In connection with navigating an environment, an autonomous vehicle perceives objects surrounding the autonomous vehicle based upon sensor signals generated by sensor systems of the autonomous vehicle. For example, the autonomous vehicle may include various sensor systems, such as a radar sensor system, a camera sensor system, and/or a lidar sensor system, for generating sensor signals. The autonomous vehicle also includes a centralized processing device that receives data based upon sensor signals generated by the sensor system and performs a variety of different tasks, such as detection of vehicles, pedestrians, and other objects. Based on an output of the processing device, the autonomous vehicle may perform a driving maneuver.

Recently, time-of-flight sensor systems have been developed for autonomous vehicles. A time-of-flight sensor system is a device used to measure distance to object(s) in an environment. The time-of-flight sensor system can capture multiple frames sequentially and combine the frames to form a point cloud. When the time-of-flight sensor system and object(s) in a scene being imaged by the time-of-flight sensor system are in relative motion to each other, the frames (or sections of the frames) are no longer pixeled-aligned. For instance, the relative motion can be dependent on object distance to the time-of-flight sensor system and speed at which the time-of-flight sensor system is moving (e.g., speed of an autonomous vehicle that includes the time-of-flight sensor system). As a result, error is introduced into estimation of depth of pixels that exhibit relative motion. Moreover, relative motion can also occur when object(s) within a field of view of the time-of-flight sensor system experience independent motion from that of the time-of-flight sensor system (e.g., a pedestrian crossing a street).

The time-of-flight sensor system captures a discrete number of frames during a period of time. However, the scene may not be static through the period of time. According to an illustration, if the time-of-flight sensor is moving at a relatively high velocity while capturing frames of a scene that includes a parked car and a pedestrian moving at a relatively low velocity, then this relative motion causes pixels of successive frames to be offset from frame to frame, which introduces error when attempting to estimate depth.

Some conventional approaches have attempted to mitigate pixel misalignment of a time-of-flight sensor system by minimizing an amount of time from a beginning of a frame capture sequence to an end of the frame capture sequence. For instance, these approaches attempt to compress the frame captures together in time such that the impact of relative motion is minimized. However, as the time period over which the discrete number of frames is compressed, integration times of the frames are shortened leading to less signal being collected for each of the frames. Yet, there is a fundamental limit in terms of how much signal is needed for each frame captured by the time-of-flight sensor system, and thus, the integration times cannot be arbitrarily shortened such that the amount of signal needed is unable to be collected. Moreover, reading information from a sensor (e.g., an imager) of a time-of-flight sensor system takes a finite amount of time; the time can be dependent on the design of the sensor and a speed of an analog-to-digital converter (ADC) of the sensor. Such inter-measurement time between integration times is used to read out, reset, and initiate integration again on the sensor. Accordingly, a design of the time-of-flight sensor system itself limits how much the amount of time from the beginning of a frame capture sequence to an end of the frame capture sequence can be compressed.

SUMMARY

The following is a brief summary of subject matter that is described in greater detail herein. This summary is not intended to be limiting as to the scope of the claims.

Described herein are various technologies for mitigating motion misalignment of a time-of-flight sensor system. A stream of frames outputted by a sensor of the time-of-flight sensor system can be received (e.g., by a computing system). The stream of frames include a series of frame sequences. A frame sequence includes a set of frames where the frames in the set have different frame types. A frame type of a frame signifies sensor parameters of the time-of-flight sensor system when the frame is captured by the time-of-flight sensor system such that different frame types signify different sensor parameters. The sensor parameters of the time-of-flight sensor system, for example, can include an illumination state of the time-of-flight sensor system (e.g., whether the time-of-flight sensor system is emitting light for the frame or is inhibited from emitting light for the frame), a relative phase delay between a transmitter system and a receiver system of the time-of-flight sensor system for the frame, and/or an integration time of the sensor of the time-of-flight sensor system for the frame. Further, a pair of non-adjacent frames in the stream of frames can be identified. The pair of non-adjacent frames can include successive frames of the same frame type, for example. According to another example, the pair of non-adjacent frames can include successive frames having relative phase delays that are 180 degrees out of phase. Moreover, computed optical flow data can be calculated based on the pair of non-adjacent frames in the stream of frames.

According to various embodiments, estimated optical flow data for at least one differing frame other than the pair of non-adjacent frames in the stream of frames can be generated based on the computed optical flow data. Further, the at least one differing frame can be realigned based on the estimated optical flow data. Moreover, object depth data can be computed based on realign frames in the frame sequence, and a point cloud including the object depth data can be outputted.

In various embodiments, the estimated optical flow data for the at least one differing frame other than the pair of non-adjacent frames in the stream can be generated by interpolating the estimated optical flow data for at least one intermediate frame between the pair of non-adjacent frames based on the computed optical flow data. According to an example, estimated optical flow data for the intermediate frames between the pair of non-adjacent frames can be computed based on the optical flow data. Pursuant to other embodiments, the estimated optical flow data for the at least one differing frame other than the pair of non-adjacent frames in the stream can be generated by extrapolating the estimated optical flow data for at least one successive frame subsequent to the pair of non-adjacent frames based on the computed optical flow data.

Moreover, according to other embodiments, transverse velocity estimate data for an object detected in the stream of frames can be generated. The pair of non-adjacent frames in the stream of frames can be identified. Moreover, computed optical flow data can be calculated based on the pair of non-adjacent frames in the stream of frames. Further, the transverse velocity estimate data for an object in the non-adjacent frames can be generated based on the computed optical flow data. The transverse velocity estimate data for the object can further be generated based on an area in an environment of the time-of flight sensor system included in a field of view of the frames and/or object depth data of the object.

The techniques set forth herein provide for motion artifact reduction, since the frames in the frame sequence can be realigned. Thus, measurements at a single pixel across the realigned frames in a frame sequence can be more likely to correspond to a common object at relatively the same depth in a scene. Further, overlapping the realigned frames can increase a signal-to-noise ratio on a given pixel; thus, alignment of frames improves the signal-to-noise ratio of the combined image. Moreover, depth accuracy of a point that has been realigned can be enhanced The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
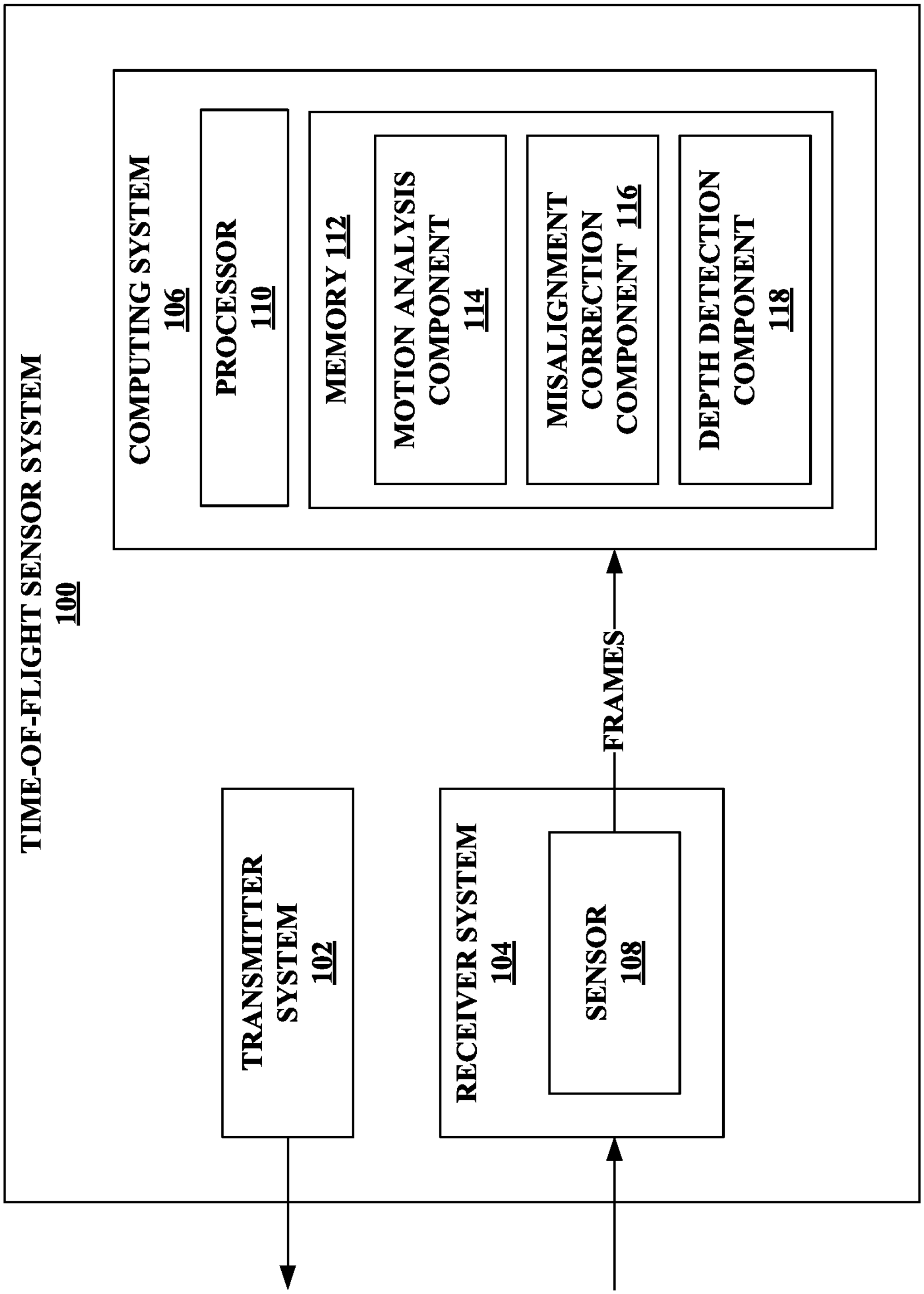
FIG. 1 illustrates a functional block diagram of an exemplary time-of-flight sensor system.

Various technologies pertaining to mitigating motion misalignment of a time-of-flight sensor system and/or generating transverse velocity estimate data for an object detected by the time-of-flight sensor system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Examples set forth herein pertain to an autonomous vehicle including a time-of-flight sensor system that mitigates motion misalignment and/or generates traverse velocity estimate data utilizing the techniques set forth herein. It is to be understood, however, that the time-of-flight sensor system described herein can be employed in a variety of different scenarios, such as flight, in drone technologies, in monitoring technologies (e.g., security technologies), in augmented reality (AR) or virtual reality (VR) technologies, and so forth. Autonomous vehicles are set forth herein as one possible use case, and features of the claims are not to be limited to autonomous vehicles unless such claims explicitly recite an autonomous vehicle.

Referring now to the drawings, FIG. 1 illustrates an exemplary time-of-flight sensor system 100. The time-of-flight sensor system 100 includes a transmitter system 102 and a receiver system 104. In the example of FIG. 1, the time-of-flight sensor system 100 can further include a computing system 106. However, in other embodiments, it is contemplated that the computing system 106 can be separate from, but in communication with, the time-of-flight sensor system 100.

The transmitter system 102 of the time-of-flight sensor system 100 can be configured to send modulated light into an environment of the time-of-flight sensor system 100. The light can propagate outwards from the time-of-flight sensor system 100, reflect off of an object in the environment of the time-of-flight sensor system 100, and return back to the time-of-flight sensor system 100. The receiver system 104 can include a sensor 108, which can collect the light received at the time-of-flight sensor system 100 and output a stream of frames.

The computing system 106 includes a processor 110 and memory 112; the memory 112 includes computer-executable instructions that are executed by the processor 110. Pursuant to various examples, the processor 110 can be or include a graphics processing unit (GPU), a plurality of GPUs, a central processing unit (CPU), a plurality of CPUs, an application-specific integrated circuit (ASIC), a digital signal processor (DSP), a microcontroller, a programmable logic controller (PLC), a field programmable gate array (FPGA), or the like.

The computing system 106 can receive the stream of frames outputted by the sensor 108 of the time-of-flight sensor system 100. The stream of frames includes a series of frame sequences. A frame sequence includes a set of frames where the frames in the set have different frame types. A frame type of a frame signifies sensor parameters of the time-of-flight sensor system 100 when the frame is captured by the time-of-flight sensor system 100 such that different frame types signify different frame parameters.

Various sensor parameters of the time-of-flight sensor system 100 are intended to fall within the scope of the hereto appended claims. For instance, the sensor parameters for a frame can include an illumination state of the time-of-flight sensor system 100 for the frame. The illumination state can indicate whether the time-of-flight sensor system 100 (e.g., the transmitter system 102) is either emitting or is inhibited from emitting light for the frame (e.g., whether the frame is a passive frame or is a frame for which the transmitter system 102 emitted a modulated light signal). Moreover, the sensor parameters of the time-of-flight sensor system 100 for a frame can include a relative phase delay between the transmitter system 102 and the receiver system 104 of the time-of-flight sensor system 100 for the frame. Further, the sensor parameters of the time-of-flight sensor system 100 for a frame can include an integration time of the sensor 108 of the time-of-flight sensor system 100 for the frame. It is contemplated that a combination of the foregoing sensor parameters can be employed by the time-of-flight sensor system 100.

Depth data of objects in the environment of the time-of-flight sensor system 100 can be computed based on frames in a frame sequence. However, as described herein, relative motion between the time-of-flight sensor system 100 and the object(s) in the environment can cause pixel misalignment between the frames in the frame sequence, thereby introducing errors in the depth estimation(s). Accordingly, the computing system 106 can employ techniques to mitigate such motion misalignment between frames.

The memory 112 of the computing system 106 can include a motion analysis component 114, a misalignment correction component 116, and a depth detection component 118. The motion analysis component 114 can identify a pair of non-adjacent frames in the stream of frames received from the sensor 108. The pair of non-adjacent frames can be identified a priori based on frame type. Moreover, the motion analysis component 114 can calculate computed optical flow data based on the pair of non-adjacent frames in the stream of frames. The motion analysis component 114 can further generate estimated optical flow data for at least one differing frame other than the pair of non-adjacent frames in the stream of frames based on the computed optical flow data. Moreover, the misalignment correction component 116 can realign the at least one differing frame based on the estimated optical flow data. The depth detection component 118 can further compute object depth data based on realigned frames in the frame sequence. The depth detection component 118 can also output a point cloud that includes the object depth data.

Figure 2:
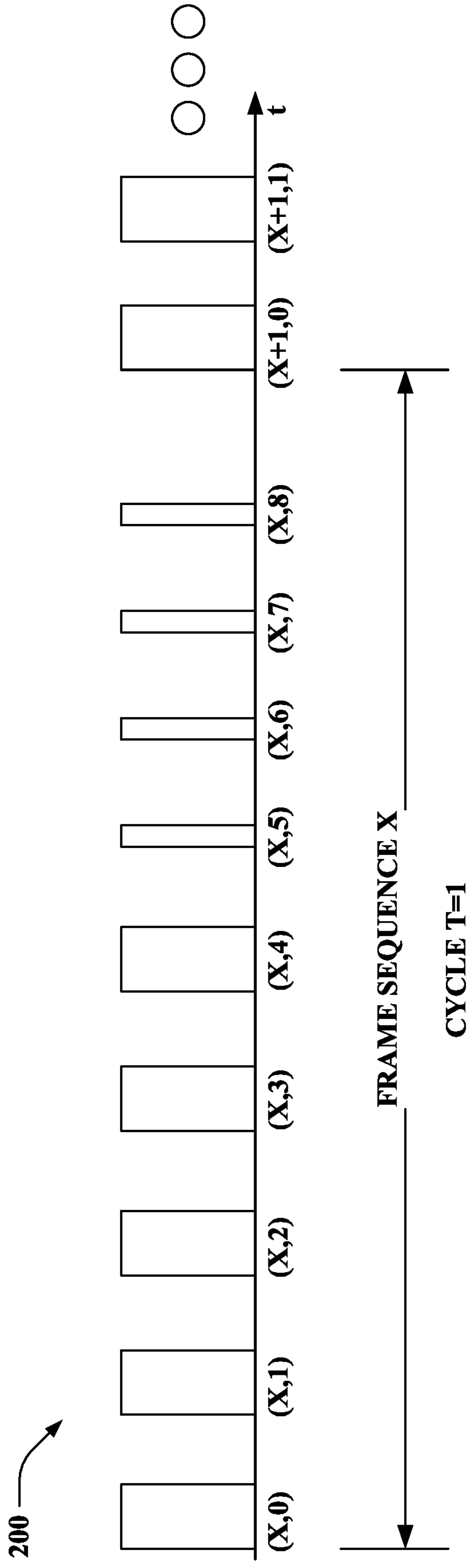
FIG. 2 illustrates an exemplary stream of frames outputted by a sensor of the time-of-flight sensor system.

Now turning to FIG. 2, illustrated is an exemplary stream of frames 200 outputted by the sensor 108 of the time-of-flight sensor system 100. As noted above, the stream of frames 200 includes a series of frame sequences. A frame sequence X and a portion of a next frame sequence X+1 in the stream of frames 200 are depicted in FIG. 2 (where X can be substantially any integer greater than 0). The frame sequence X includes a set of frames, where each frame in the frame sequence X has a different frame type. Thus, each frame in the frame sequence X is captured by the time-of-flight sensor system 100 using different sensor parameters. In the depicted example of FIG. 2, the frame sequence X includes nine frames (e.g., nine different frame types): a frame (X,0), a frame (X,1), a frame (X,2), a frame (X,3), a frame (X,4), a frame (X,5), a frame (X,6), a frame (X,7), and a frame (X,8). Moreover, other frame sequences in the series of frame sequences of the stream of frames 200 can be substantially similar to the frame sequence X. For instance, the frame sequence X+1 can similarly include nine frames (e.g., nine different frame types): a frame (X+1,0), a frame (X+1,1), a frame (X+1,2), a frame (X+1,3), a frame (X+1,4), a frame (X+1,5), a frame (X+1,6), a frame (X+1,7), and a frame (X+1,8). Moreover, the sensor parameters employed by the time-of-flight sensor system 100 when capturing a first frame in a frame sequence can be the same across frame sequences (e.g., the sensor parameters for the frame (X,0) and the frame (X+1,0) are substantially similar, both are frame type 0), the sensor parameters employed by the time-of-flight sensor system 100 when capturing a second frame in a frame sequence can be the same across frame sequences (e.g., the sensor parameters for the frame (X,1) and the frame (X+1,1) are substantially similar, both are frame type 1), and so forth. While various examples set forth herein describe nine frames being included in a frame sequence of the stream of frames 200, it is to be appreciated that a frame sequence can include two or more frames; thus, the claimed subject matter is not limited to frame sequences including nine frames.

Examples of the sensor parameters of the frames in the frame sequence X (and similarly the other frame sequences in the stream of frames 200) are described below. Again, it is to be appreciated that the claimed subject matter is not so limited, as other numbers of frames can be included in each frame sequence or different sensor parameters can be employed.

A first frame (X,0) in the frame sequence X can be a passive frame with no illumination (e.g., a grayscale frame). Thus, the illumination state of this first frame (X,0) can signify that the time-of-flight sensor system 100 (e.g., the transmitter system 102) is inhibited from emitting light for the frame (X,0). The first frame (X,0) can also have a relatively long integration time of the sensor 108. The remaining eight frames in the frame sequence X can be illuminated frames; accordingly, the illumination state for the remaining frames (X,1)-(X,8) can signify that the time-of-flight sensor system 100 (e.g., the transmitter system 102)

emits light for such frames. Moreover, the frames (X,1)-(X,8) can have different combinations of relative phase delays between the transmitter system 102 and the receiver system 104 of the time-of-flight sensor system 100 and integration times of the sensor 108.

More particularly, the second frame (X,1) in the frame sequence X can have a 0° relative phase delay between the transmitter system 102 and the receiver system 104, and the relatively long integration time for the sensor 108. Moreover, the third frame (X,2) in the frame sequence X can have a 90° relative phase delay between the transmitter system 102 and the receiver system 104, and the relatively long integration time of the sensor 108. Further, the fourth frame (X,3) in the frame sequence X can have a 180° relative phase delay between the transmitter system 102 and the receiver system 104, and the relatively long integration time of the sensor 108. The fifth frame (X,4) in the frame sequence X can have a 270° relative phase delay between the transmitter system 102 and the receiver system 104, and the relatively long integration time of the sensor 108.

The sixth frame (X,5) in the frame sequence X can have a 0° relative phase delay between the transmitter system 102 and the receiver system 104, and a relatively short integration time of the sensor 108. The seventh frame (X,6) in the frame sequence X can have a 90° relative phase delay between the transmitter system 102 and the receiver system 104, and the relatively short integration time of the sensor 108. Moreover, the eighth frame (X,7) in the frame sequence X can have a 180° relative phase delay between the transmitter system 102 and the receiver system 104, and the relatively short integration time of the sensor 108. Further, the ninth frame (X,8) in the frame sequence X can have a 270° relative phase delay between the transmitter system 102 and the receiver system 104, and the relatively short integration time of the sensor 108.

As noted above, each frame sequence in the stream of frames 200 can be substantially similar to each other. Thus, the order of frame types within each of the frame sequences in the stream of frames 200 can be repeated.

According to an example, the set of frames in the frame sequence can be captured by the time-of-flight sensor system 100 over a period of time on the order of milliseconds or tens of milliseconds (e.g., between 1 millisecond and 100 milliseconds, between 10 milliseconds and 100 milliseconds). The period of time over which the frames of the frame sequence are captured as well as the relative motion between the time-of-flight sensor system 100 and object(s) in a scene can lead to misalignment between pixels of the frames (or portions thereof).

Moreover, conventional relative motion estimation techniques may not be suited for the frames in the stream of frames 200 due to frame-to-frame variation in scene structure induced by changing active illumination between frames (e.g., changing the sensor parameters of the time-of-flight sensor 100 for the frames in each of the frame sequences). A pre-condition for such conventional relative motion estimate techniques is that each frame is substantially similar to a previous frame in a stream. In contrast, as described herein, the computing system 106 can mitigate such motion misalignment. The computing system 106 can correct the time-based misalignment between frames of different frame types. The motion analysis component 114 identifies frame pairs that have similar scene structure (e.g., non-adjacent frames in the stream of frames 200). The motion analysis component 114 further compares such frames in the pair to calculate computed optical flow data. Moreover, the motion analysis component 114 also generates estimated optical flow data for intermediate or future frame(s) based on the computed optical flow data (e.g., via interpolation or extrapolation).

Figure 3:
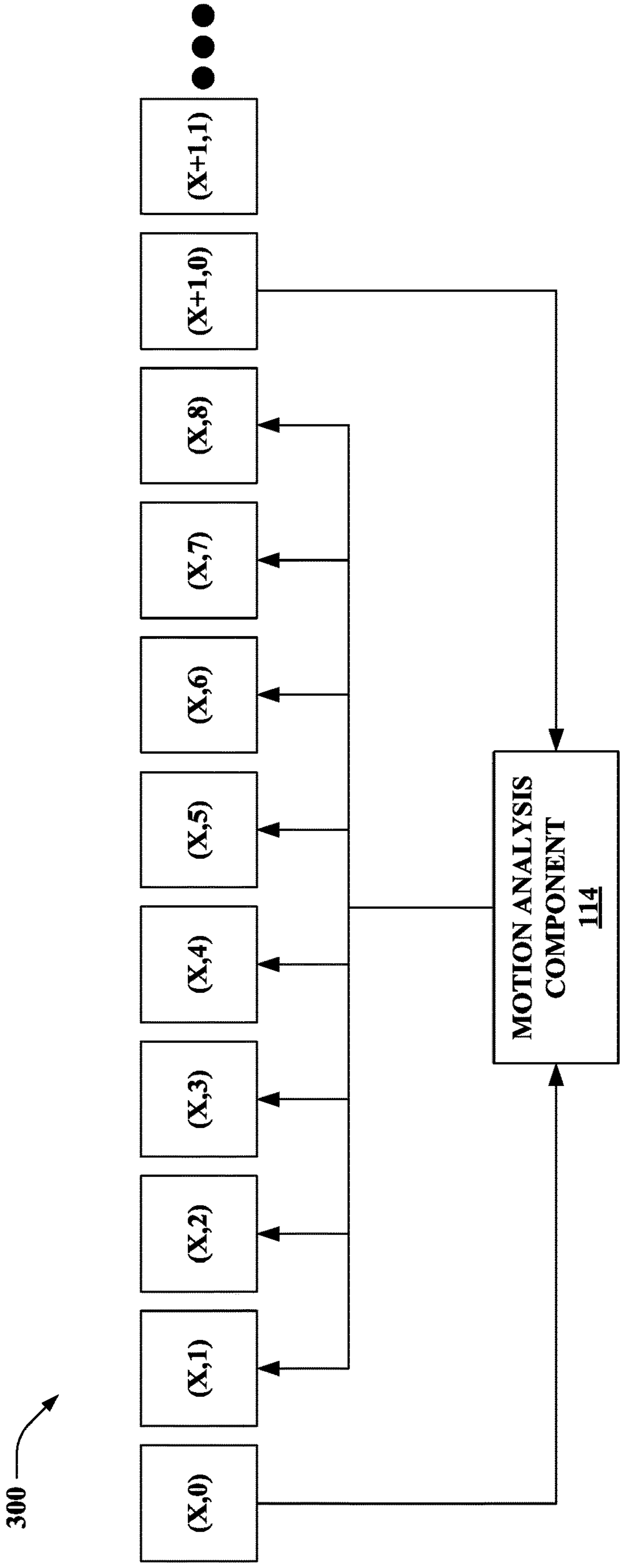
FIG. 3 illustrates an exemplary technique that can be employed by a motion analysis component for interpolating estimated optical flow data for frames in the stream of frames in various embodiments.

With reference to FIG. 3, illustrated is an exemplary technique 300 that can be employed by the motion analysis component 114 for interpolating estimated optical flow data for frames in the stream of frames 200 in various embodiments. As noted above, the motion analysis component 114 identifies a pair of non-adjacent frames in the stream of frames. Further, the motion analysis component 114 calculates computed optical flow data based on the pair of non-adjacent frames. Moreover, the motion analysis component 114 estimates optical flow data for at least one differing frame other than the pair of non-adjacent frames in the stream of frames based on the computed optical flow data.

In the example of FIG. 3, the pair of non-adjacent frames identified by the motion analysis component 114 includes the frame (X,0) and the frame (X+1,0). Thus, the motion analysis component 114 identifies a pair of non-adjacent frames in the stream of frames that are of the same frame type in the example of FIG. 3. More particularly, the pair of non-adjacent frames in the stream of frames identified by the motion analysis component 114 in the example of FIG. 3 include successive passive frames for which the time-of-flight sensor system 100 is inhibited from emitting light (e.g., the frame (X,0) and the frame (X+1,0) are successive grayscale frames in the stream of frames from successive frame sequences).

Further, the motion analysis component 114 can calculate computed optical flow data based on the pair of non-adjacent frames in the stream of frames. Thus, in the depicted example of FIG. 3, the motion analysis component 114 can calculate the computed optical flow data based on the frame (X,0) and the frame (X+1,0) (e.g., based on a comparison between the frame (X,0) and the frame (X+1,0)). Accordingly, rather than performing an optical flow analysis between adjacent frames in the stream of frames, the motion analysis component 114 performs the optical flow analysis between the non-adjacent pair of frames in the stream of frames.

Figure 4:
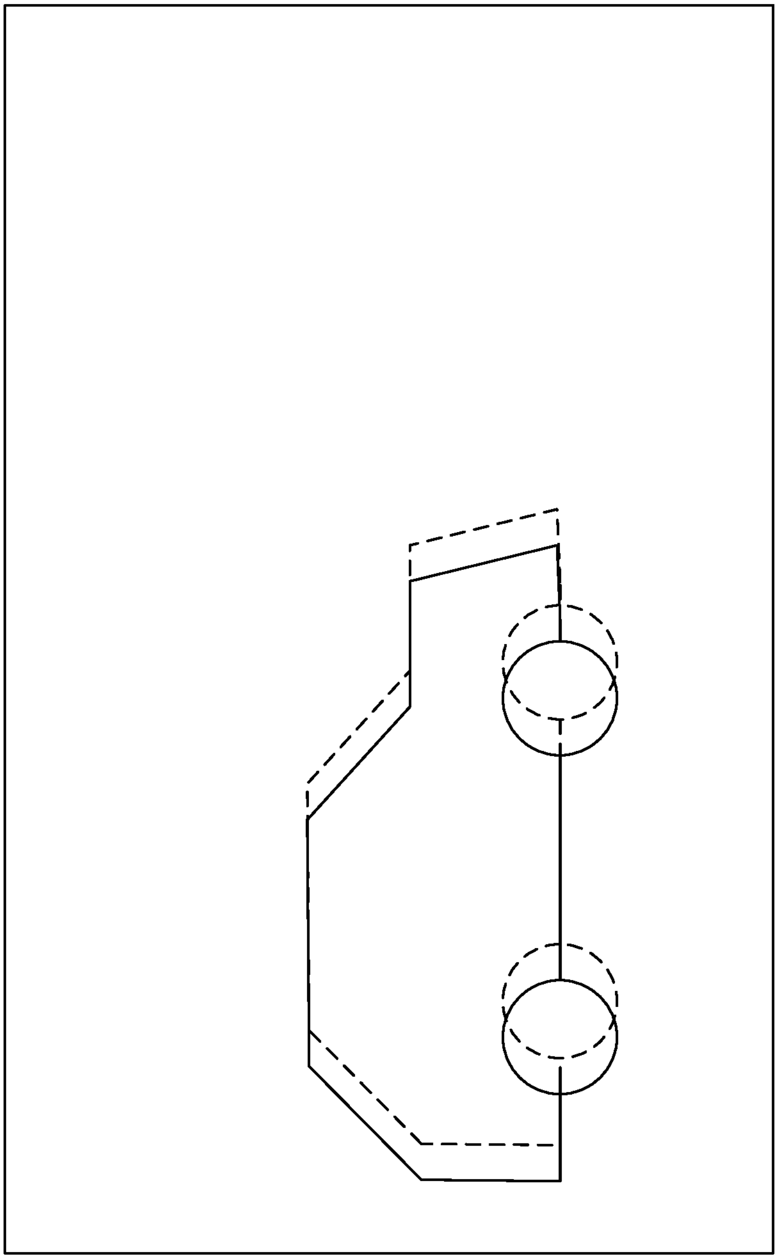
FIG. 4 illustrates an example of successive passive frames in the stream of frames.

FIG. 4 depicts an example of the successive passive frames (X,0) (e.g., solid line) and (X+1,0) (e.g., dashed line). The motion analysis component 114 can calculate vertical and horizontal optical flow values for each of the pixels in the frame. Thus, the computed optical flow data can represent the relative motion of the illustrated car between the successive passive frames (e.g., a horizontal shift between the frames) in relation to the time-of-flight sensor system 100.

Reference is again made to FIG. 3. As set forth above, the motion analysis component 114 generates estimated optical flow data for at least one differing frame other than the pair of non-adjacent frames in the stream of frames based on the computed optical flow data. In the example set forth in FIG. 3, the motion analysis component 114 interpolates the estimated optical flow data for the intermediate frames between the pair of non-adjacent frames based on the computed optical flow data. Thus, the estimated optical flow data for the frames (X,1)-(X,8) can be interpolated based on the computed optical flow data (e.g., calculated based on the frames (X,0) and (X+1,0)). In the example of FIG. 3, the computed optical flow data is calculated by the motion analysis component 114 based on successive passive frames for which the time-of-flight sensor system 100 is inhibited from emitting light, and estimated optical flow data for each of the intermediate frames between the successive passive frames is interpolated by the motion analysis component 114 based on the computed optical flow data. Frames other than the passive frames in the stream are not used for calculating the computed optical flow data in the example of FIG. 3; rather, estimated optical flow data for such frames other than the passive frames is interpolated.

The motion analysis component 114 can further generate the estimated optical flow data for the intermediate frames between the pair of non-adjacent frames based on timestamp information for the intermediate frames. For example, based on a normalized frame cycle time T=1 (e.g., a normalized period of time between the frame (X,0) and the frame (X+1,0)), the following provides an example of measured timing ratio factors F (e.g., determined based on respective timestamp information) that can be used by the motion analysis component 114 to represent timing of the frames (X,1)-(X+1,0) relative to the frame (X,0): F=[65.2174e−003, 152.1739e−003, 217.3913e−003, 282.6087e−003, 369.5652e−003, 456.5217e−003, 521.7391e−003, 608.6957e−003, 1.0000e+000]. It is contemplated, however, that the claimed subject matter is not limited to the above example, as timestamp information for each of the frames can be recorded and utilized by the motion analysis component 114 to compute the measured timing ratio factors F.

The following sets forth an example of an algorithm that can be implemented by the motion analysis component 114 to interpolate the estimated optical flow data for the intermediate frames.

$$[I\ J]=[I+\text{Round}(F*OVFv)\ J+\text{Round}(F*OVFh)]$$

Where

[I J]: the row and column index representing pixels of the frames;

F: the measured timing ratio factors; and

OVFv and OVFh: vertical and horizontal optical flow for each of the pixels.

According to various examples, the motion between the pair of non-adjacent frames can be assumed to be linear (e.g., the motion analysis component 114 can linearly interpolate the estimated optical flow data for the intermediate frames). However, in other examples, it is contemplated that the motion can be modeled in a non-linear manner (e.g., acceleration can be modeled as part of the interpolation performed by the motion analysis component 114).

Figure 5:
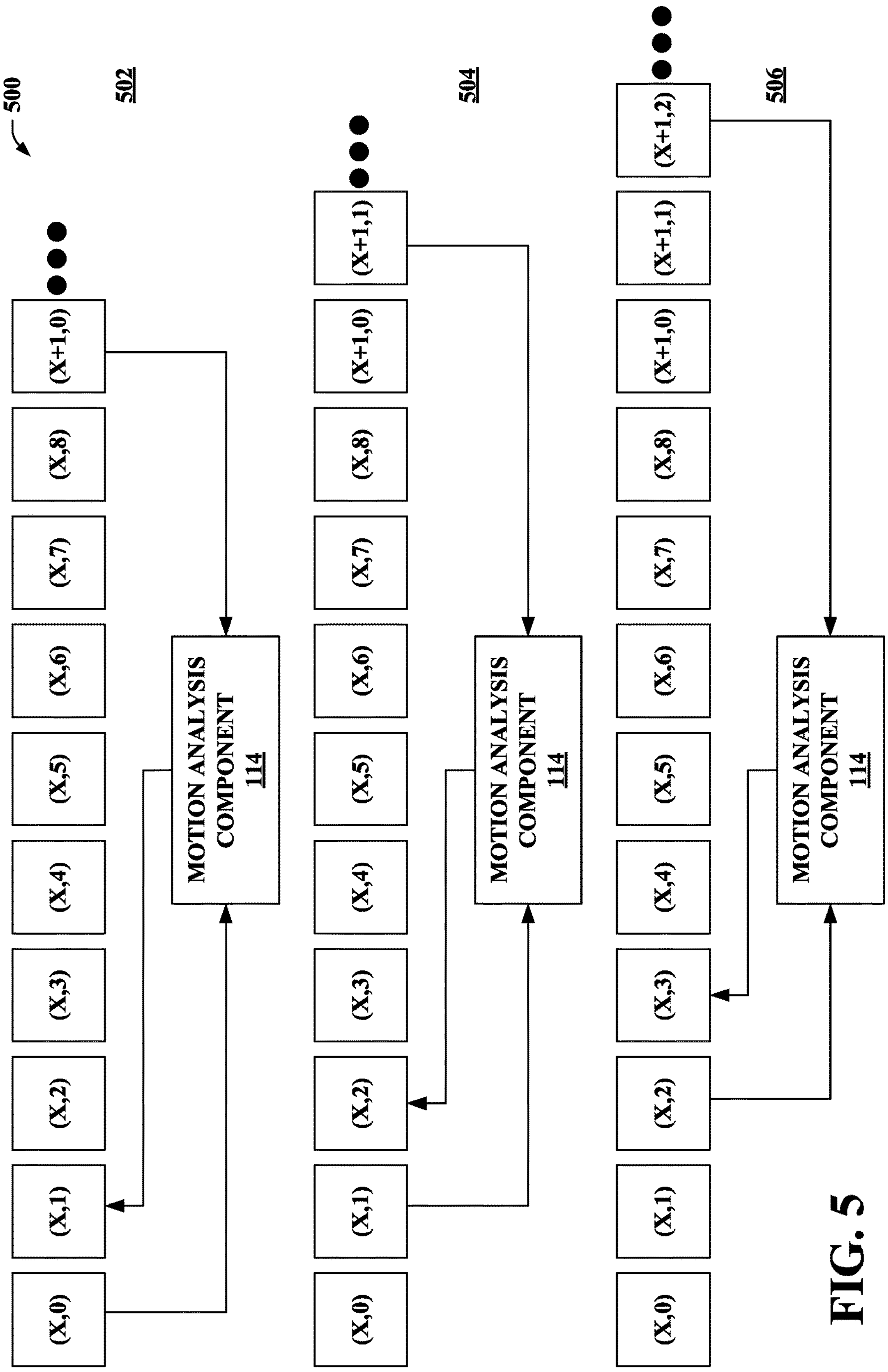
FIG. 5 illustrates another exemplary technique that can be employed by the motion analysis component for interpolating estimated optical flow data for frames in the stream of frames in various embodiments.

With reference to FIG. 5, illustrated is another exemplary technique 500 that can be employed by the motion analysis component 114 for interpolating estimated optical flow data for frames in the stream of frames 200 in various embodiments. FIG. 5 depicts a series of operations that can be performed by the motion analysis component 114; this series of operations can be repeated through the stream of frames.

At 502, the pair of non-adjacent frames identified by the motion analysis component 114 includes the frame (X,0) and the frame (X+1,0). Similar to the example of FIG. 3, the motion analysis component 114 can identify a pair of non-adjacent frames in the stream of frames that are of the same frame type. Further, the motion analysis component 114 can calculate computed optical flow data based on the pair of non-adjacent frames (X,0) and (X+1,0). Moreover, at 502, the motion analysis component 114 interpolates the estimated optical flow data for an intermediate frame between the pair of non-adjacent frames based on the computed optical flow data. More particularly, the motion analysis component 114 interpolates the estimated optical flow data for the frame (X,1) based on the computed optical flow data calculated based on the pair of non-adjacent frames (X,0) and (X+1,0).

Moreover, at 504, the pair of non-adjacent frames identified by the motion analysis component 114 includes the frame (X,1) and the frame (X+1,1). Again, the pair of non-adjacent frames (X,1) and (X+1,1) are of the same frame type (although of a different frame type from the frame pair used at 502). Further, the motion analysis component 114 can calculate computed optical flow data based on the pair of non-adjacent frames (X,1) and (X+1,1). Moreover, at 504, the motion analysis component 114 interpolates the estimated optical flow data for an intermediate frame (X,2) between the pair of non-adjacent frames (X,1) and (X+1,1) based on the computed optical flow data calculated based on the pair of non-adjacent frames (X,1) and (X+1,1).

Further, at 506, the pair of non-adjacent frames identified by the motion analysis component 114 includes the frame (X,2) and the frame (X+1,2). Again, the pair of non-adjacent frames (X,2) and (X+1,2) are of the same frame type (although of a different frame type from the frame pairs used at 502 and 504). Further, the motion analysis component 114 can calculate computed optical flow data based on the pair of non-adjacent frames (X,2) and (X+1,2). Moreover, at 506, the motion analysis component 114 interpolates the estimated optical flow data for an intermediate frame (X,3) between the pair of non-adjacent frames (X,2) and (X+1,2) based on the computed optical flow data calculated based on the pair of non-adjacent frames (X,2) and (X+1,2).

The foregoing can be repeated across the stream of frames. Thus, the motion analysis component 114 can calculate the computed optical flow data for each pair of non-adjacent frames of the same frame type in successive frame sequences in the stream of frames. Moreover, similar to above with respect to FIG. 3, the motion analysis component 114 can further generate the estimated optical flow data for an intermediate frame based on the timestamp information for the intermediate frame.

According to an example, it is contemplated that the computed optical flow data generated at 502 can be used to interpolate the estimated optical flow data of the frame (X,1) and thereafter discarded. Following this example, the computed optical flow data generated at 504 can be used to interpolate the estimated optical flow data of the frame (X,2) without using the computed optical flow data generated at 502. However, in another example, the computed optical flow data generated at 502 can be combined with the computed optical flow data generated at 504 and used to interpolate the estimated optical flow data of the frame (X,2).

Figure 6:
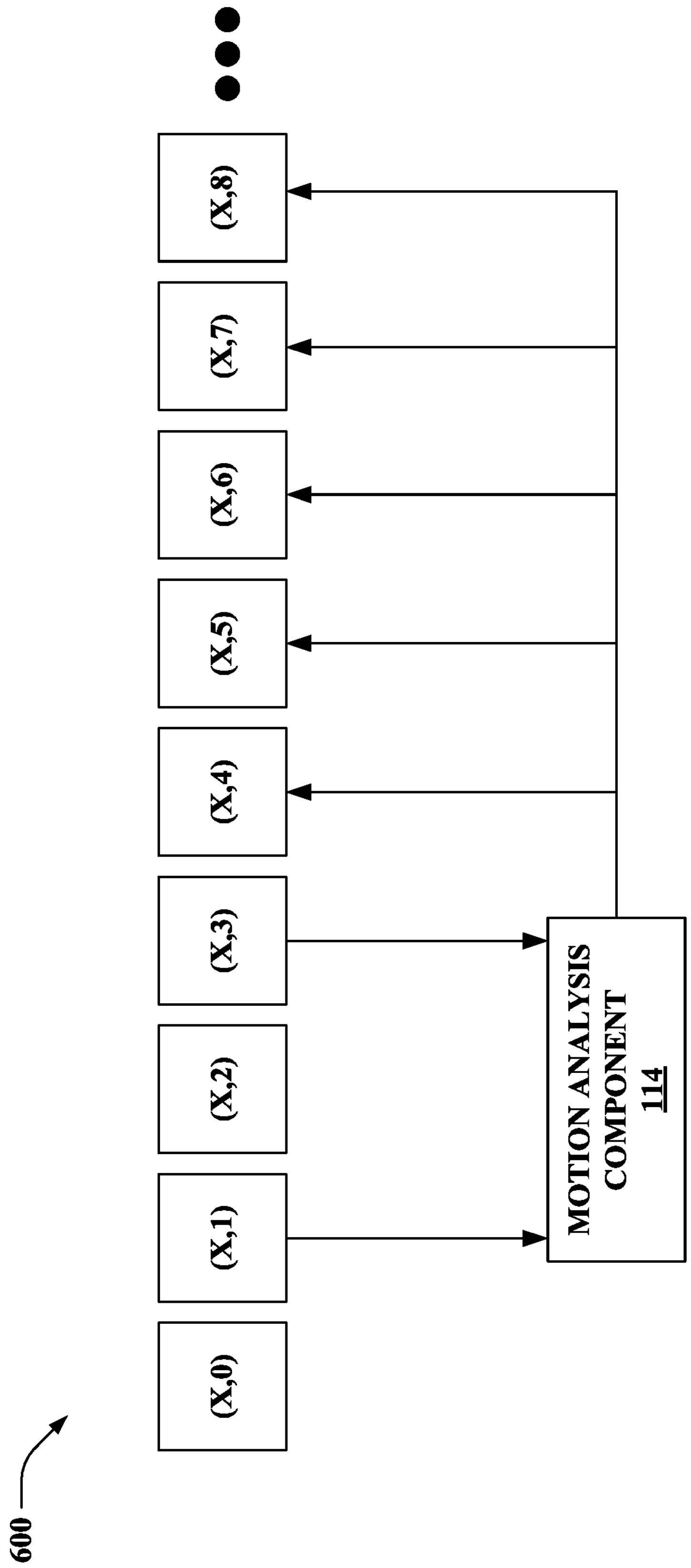
FIG. 6 illustrates an exemplary technique that can be employed by the motion analysis component for extrapolating estimated optical flow data for frames in the stream of frames in various embodiments.

Turning to FIG. 6, illustrated is an exemplary technique 600 that can be employed by the motion analysis component 114 for extrapolating estimated optical flow data for frames in the stream of frames 200 in various embodiments. In the example of FIG. 6, the pair of non-adjacent frames identified by the motion analysis component 114 include successive frames having relative phase delays that are 180 degrees out of phase. Thus, the pair of non-adjacent frames identified by the motion analysis component 114 includes the frame (X,1) and the frame (X,3). While the frames (X,1) and (X,3) are of different frame types, the relative phase delays being 180 degrees out of phase results in the frames being correlated with each other. The motion analysis component 114 can calculate the computed optical flow data based on the pair of non-adjacent frames (X,1) and (X,3). Further, the motion analysis component 114 can extrapolate the estimated optical flow data for at least one successive frame subsequent to the pair of non-adjacent frames based on the computed optical flow data. For instance, the motion analysis component 114 can extrapolate estimated optical flow data for the successive frames (X,4)-(X,8) based on the computed optical flow data calculated from the frame pair (X,1) and (X,3). According to another example, it is contemplated that the motion analysis component 114 can also extrapolate estimated optical flow data for frame(s) of a next frame sequence X+1 based on the computed optical flow data calculated from the frame pair (X,1) and (X,3). Pursuant to another example, differing frame pairs that include successive frames having relative phase delays that are 180 degrees out of phase within a frame sequence can be utilized by the motion analysis component 114 (e.g., the frame pair (X,1) and (X,3) can be employed to extrapolate estimated optical flow data for the frame (X,4), the frame pair (X,2) and (X,4) can be employed to extrapolate estimated optical flow data for the frame (X,5), etc.).

Reference is now generally made to FIGS. 1-6. As described herein, the motion analysis component 114 calculates the computed optical flow data based on the pair of non-adjacent frames in the stream of frames. Further, the motion analysis component 114 can utilize one or more of the techniques set forth herein to generate estimated optical flow data for frames in the stream of frames. The computed optical flow data and the estimated optical flow data can be employed by the misalignment correction system 116 to realign frames in the stream of frames. Thus, per-frame optical flow data can be used to realign frames to mitigate motion misalignment artifacts in the stream of frames. Further, the depth detection component 118 can compute object depth data based on the realigned frames. For instance, the depth detection component 118 can compute object depth data based on the realigned frames in a frame sequence. Moreover, the depth detection component 118 can output a point cloud that includes the object depth data.

The techniques set forth herein provide for motion artifact reduction, since the frames in the frame sequence can be realigned. Thus, measurements at a single pixel across the realigned frames in a frame sequence can be more likely to correspond to a common object at relatively the same depth in a scene. Further, overlapping the realigned frames can increase a signal-to-noise ratio on a given pixel; thus, alignment of frames improves the signal-to-noise ratio of the combined image. Moreover, depth accuracy of a point that has been realigned can be enhanced.

Figure 7:
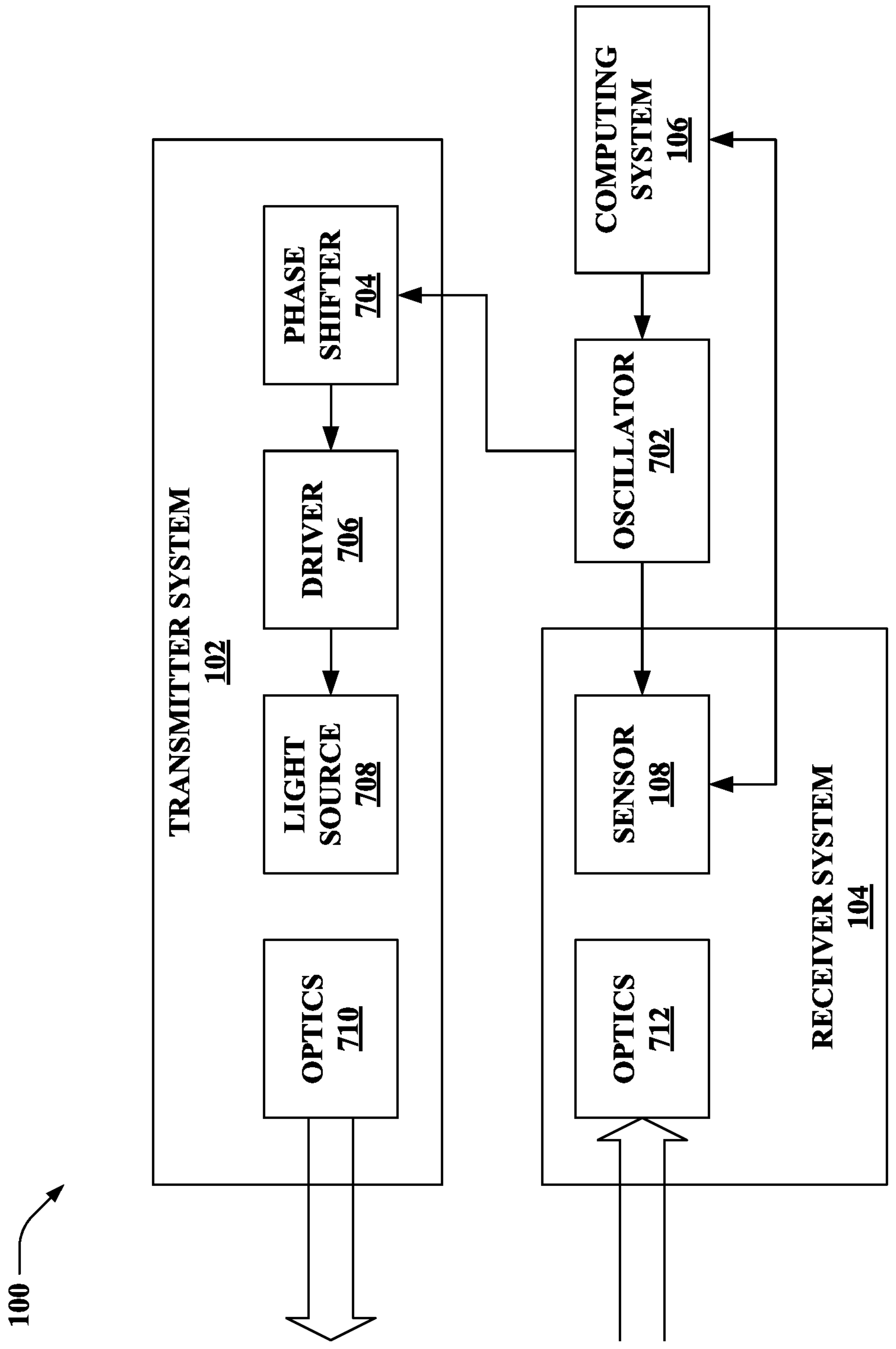
FIG. 7 illustrates a functional block diagram of another exemplary time-of-flight sensor system.

Now turning to FIG. 7, illustrated is an example of the time-of-flight sensor system 100 according to various embodiments (e.g., a time-of-flight camera system). The time-of-flight sensor system 100 of FIG. 7 again includes the transmitter system 102, the receiver system 104, and the computing system 106; yet, it is also to be appreciated that the computing system 106 can be separate from, but in communication with, the time-of-flight sensor system 100. The time-of-flight sensor system 100 can also include an oscillator 702. The transmitter system 102 can further include a phase shifter 704, a driver 706, a light source 708, and optics 710. Moreover, the receiver system 104 can include the sensor 108 (e.g., a time-of-flight sensor chip) and optics 712.

The oscillator 702 can generate a radio frequency (RF) oscillator clock signal, which can be sent to the phase shifter 704 and the sensor 108. The phase shifter 704 can delay the radio frequency oscillator clock signal received from the oscillator 702 (relative to the radio frequency oscillator clock signal provided to the sensor 108) to provide a desired relative phase delay between the transmitter system 102 and the receiver system 104 for a given frame. The delayed signal can be inputted to the driver 706 to modulate the light source 708 (e.g., a light emitting diode (LED) or LED array). Modulated light outputted by the light source 708 can be shaped by the optics 710 and transmitted into an environment of the time-of-flight sensor system 100. Thus, modulated light transmitted by the transmitter system 102 can include an RF signal (e.g., amplitude modulated signal, an RF-wavefront).

The light transmitted into the environment can be incident upon object(s) in the environment and can back-scatter. Returned light carrying three-dimensional information with the RF signal (e.g., RF-wavefront) with different time-of-flight delays can be mapped by the optics 712 onto the sensor 108 (e.g., a time-of-flight sensor). Further, the sensor 108 can communicate with the computing system 106. The computing system 106 can control the sensor 108 and/or can receive the stream of frames (e.g., including digitized three-dimensional information) from the sensor 108. As described herein, the computing system 106 can perform various signal processing on the stream of frames to generate an output (e.g., a point cloud).

Although not shown, in another example, it is contemplated that the phase shifter 704 can be included as part of the receiver system 102 rather than included as part of the transmitter system 102. Following this example, the oscillator 702 can send the RF oscillator clock signal to the driver 706 and the phase shifter 704 (which can be included between the oscillator 702 and the sensor 108). Pursuant to another example, the time-of-flight sensor system 100 can include two phase shifters.

Figure 8:
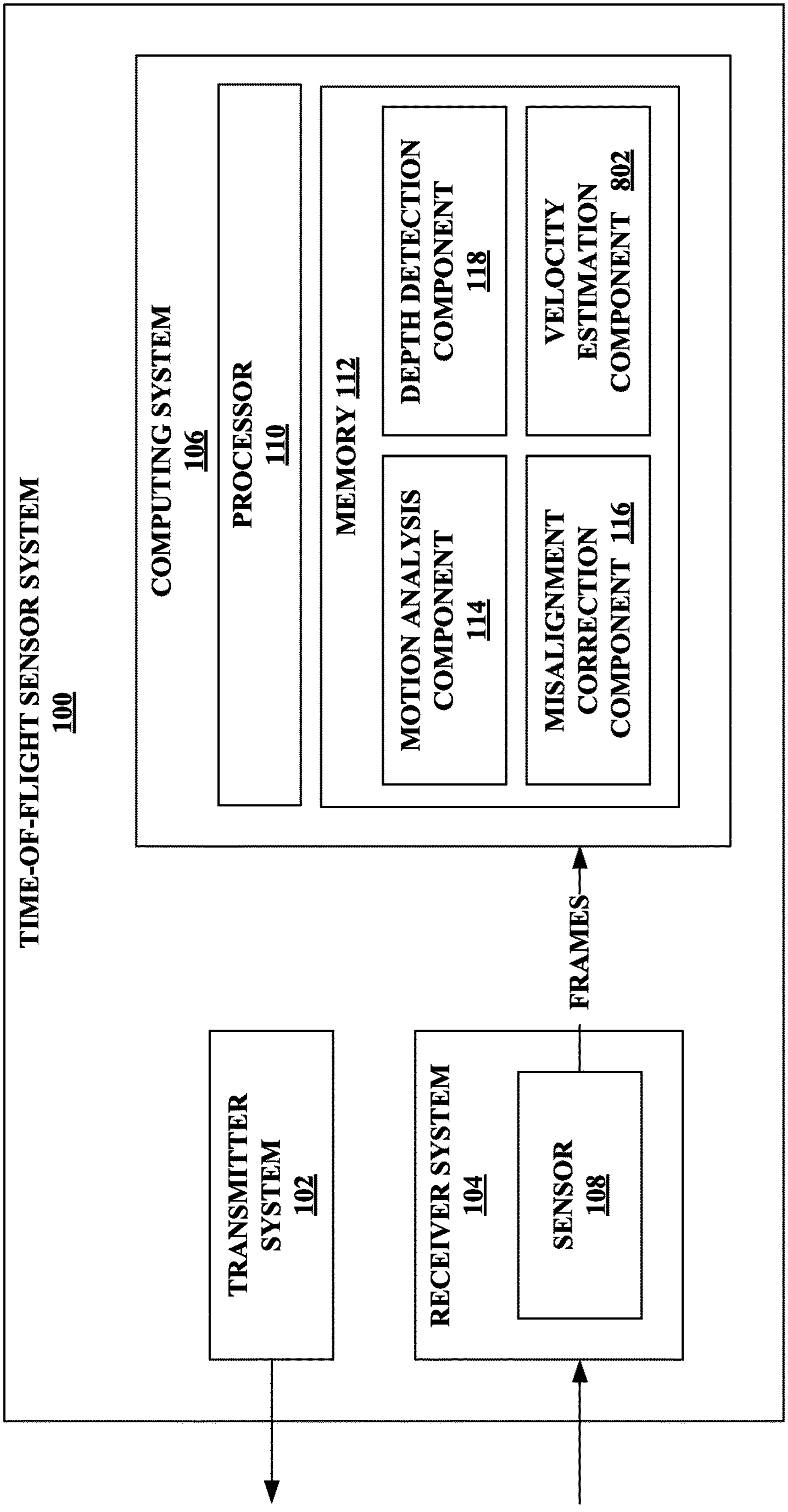
FIG. 8 illustrates a functional block diagram of another exemplary time-of-flight sensor system.

Referring now to FIG. 8, illustrated is another example of the time-of-flight sensor system 100. Again, the time-of-flight sensor system 100 includes the transmitter system 102 and the receiver system 104 (including the sensor 108). The time-of-flight sensor system 100 can also include the computing system 106. In the example of FIG. 8, the memory 112 includes the motion analysis component 114, the misalignment correction component 116, the depth detection component 118, and a velocity estimation component 802.

Similar to above, the computing system 106 can receive the stream of frames outputted by the sensor 108 (e.g., the stream of frames 200). Moreover, the motion analysis component 114 can identify a pair of non-adjacent frames in the stream of frames. The motion analysis component 114 can further calculate computed optical flow data based on the pair of non-adjacent frames in the stream of frames.

The velocity estimation component 802 can generate transverse velocity estimate data for an object in the non-adjacent frames based on the computed optical flow data. The transverse velocity estimate data can include vertical and horizontal velocity estimate data. The transverse velocity estimate data for the object can further be generated by the velocity estimation component 802 based on an area in an environment of the time-of-flight sensor 100 included in a field of view of the frames. Moreover, the velocity estimation component 802 can generate the transverse velocity estimate data for the object based on object depth data for the object (e.g., generated by the depth detection component 118 based on realigned frames in the frames sequence adjusted by the misalignment correction component 116 as described herein). Pursuant to another example, it is contemplated that the velocity estimation component 802 can additionally or alternatively generate the velocity estimate data for the object based on estimated optical flow data generated by the motion analysis component 114.

According to various examples, it is contemplated that the velocity estimation component 802 can additionally or alternatively generate radial velocity estimate data for an object.

The velocity estimation component 802 can utilize two depth maps and two optical flow maps to evaluate pixel-wise correspondence between two sequential depth map estimates. Based on such pixel-wise correspondence, the velocity estimation component 802 can output the radial velocity estimate data.

Figure 9:
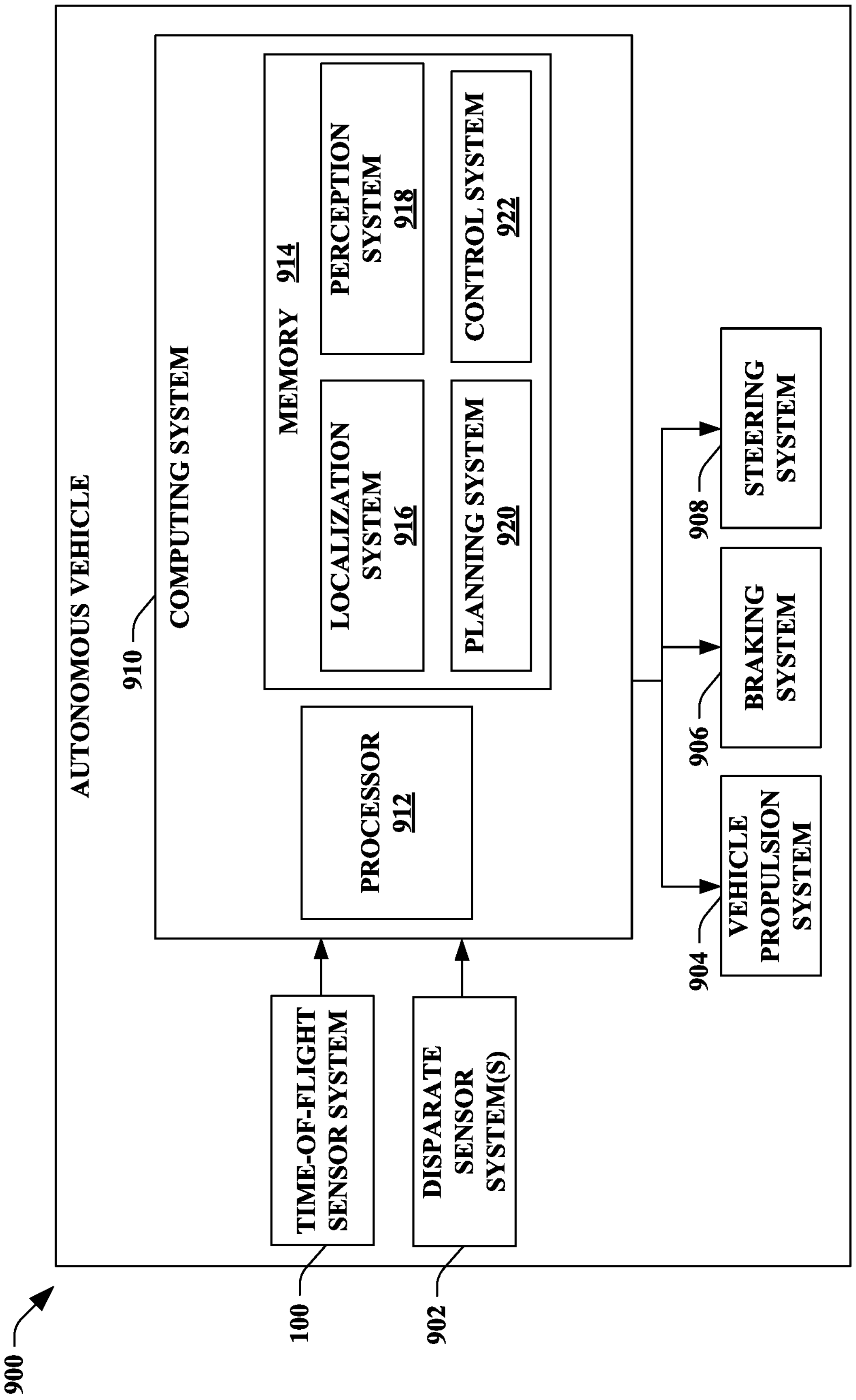
FIG. 9 illustrates a functional block diagram of an exemplary autonomous vehicle that includes the time-of-flight sensor system.

Turning to FIG. 9, illustrated is an autonomous vehicle 900. The autonomous vehicle 900 can navigate about roadways without human conduction based upon sensor signals outputted by sensor systems of the autonomous vehicle 900. The autonomous vehicle 900 includes a plurality of sensor systems. More particularly, the autonomous vehicle 900 includes the time-of-flight sensor system 100 described herein. The autonomous vehicle 900 can further include one or more disparate sensor systems 902. The disparate sensor systems 902 can include GPS sensor system(s), ultrasonic sensor sensor(s), infrared sensor system(s), camera system(s), lidar sensor system(s), radar sensor system(s), and the like. The sensor systems 100 and 902 can be arranged about the autonomous vehicle 900.

The autonomous vehicle 900 further includes several mechanical systems that are used to effectuate appropriate motion of the autonomous vehicle 900. For instance, the mechanical systems can include, but are not limited to, a vehicle propulsion system 904, a braking system 906, and a steering system 908. The vehicle propulsion system 904 may be an electric engine or a combustion engine. The braking system 906 can include an engine brake, brake pads, actuators, and/or any other suitable componentry that is configured to assist in decelerating the autonomous vehicle 900. The steering system 908 includes suitable componentry that is configured to control the direction of movement of the autonomous vehicle 900.

The autonomous vehicle 900 additionally includes a computing system 910 that is in communication with the sensor systems 100 and 902, the vehicle propulsion system 904, the braking system 906, and the steering system 908. The computing system 910 includes a processor 912 and memory 914; the memory 914 includes computer-executable instructions that are executed by the processor 912. Pursuant to various examples, the processor 912 can be or include a graphics processing unit (GPU), a plurality of GPUs, a central processing unit (CPU), a plurality of CPUs, an application-specific integrated circuit (ASIC), a digital signal processor (DSP), a microcontroller, a programmable logic controller (PLC), a field programmable gate array (FPGA), or the like.

According to an example, the computing system 910 can include the computing system 106. In another example, the time-of-flight sensor system 100 can include the computing system 106, and the computing system 910 can be in communication with the computing system 106 of the time-of-flight sensor system 100.

The memory 914 of the computing system 910 can include a localization system 916, a perception system 918, a planning system 920, and a control system 922. The localization system 916 can be configured to determine a local position of the autonomous vehicle 900. The perception system 918 can be configured to perceive objects nearby the autonomous vehicle 900 (e.g., based on outputs from the sensor systems 100 and 902). For instance, the perception system 918 can detect, classify, and predict behaviors of objects nearby the autonomous vehicle 900. The perception system 918 (and/or differing system(s) included in the memory 914) can track the objects nearby the autonomous vehicle 900 and/or make predictions with respect to the environment in which the autonomous vehicle 900 is operating (e.g., predict the behaviors of the objects nearby the autonomous vehicle 900). Further, the planning system 922 can plan motion of the autonomous vehicle 900. Moreover, the control system 922 can be configured to control at least one of the mechanical systems of the autonomous vehicle 900 (e.g., at least one of the vehicle propulsion system 904, the braking system 906, and/or the steering system 908).

An operation of the autonomous vehicle 900 can be controlled by the computing system 910 based at least in part on the output data generated by the time-of-flight sensor system 100. While the time-of-flight sensor system 100 is described as being included as part of the autonomous vehicle 900 in FIG. 9, it is contemplated that the time-of-flight sensor system 100 can be utilized in other types of scenarios (e.g., included in other types of systems, etc.).

Figure 10:
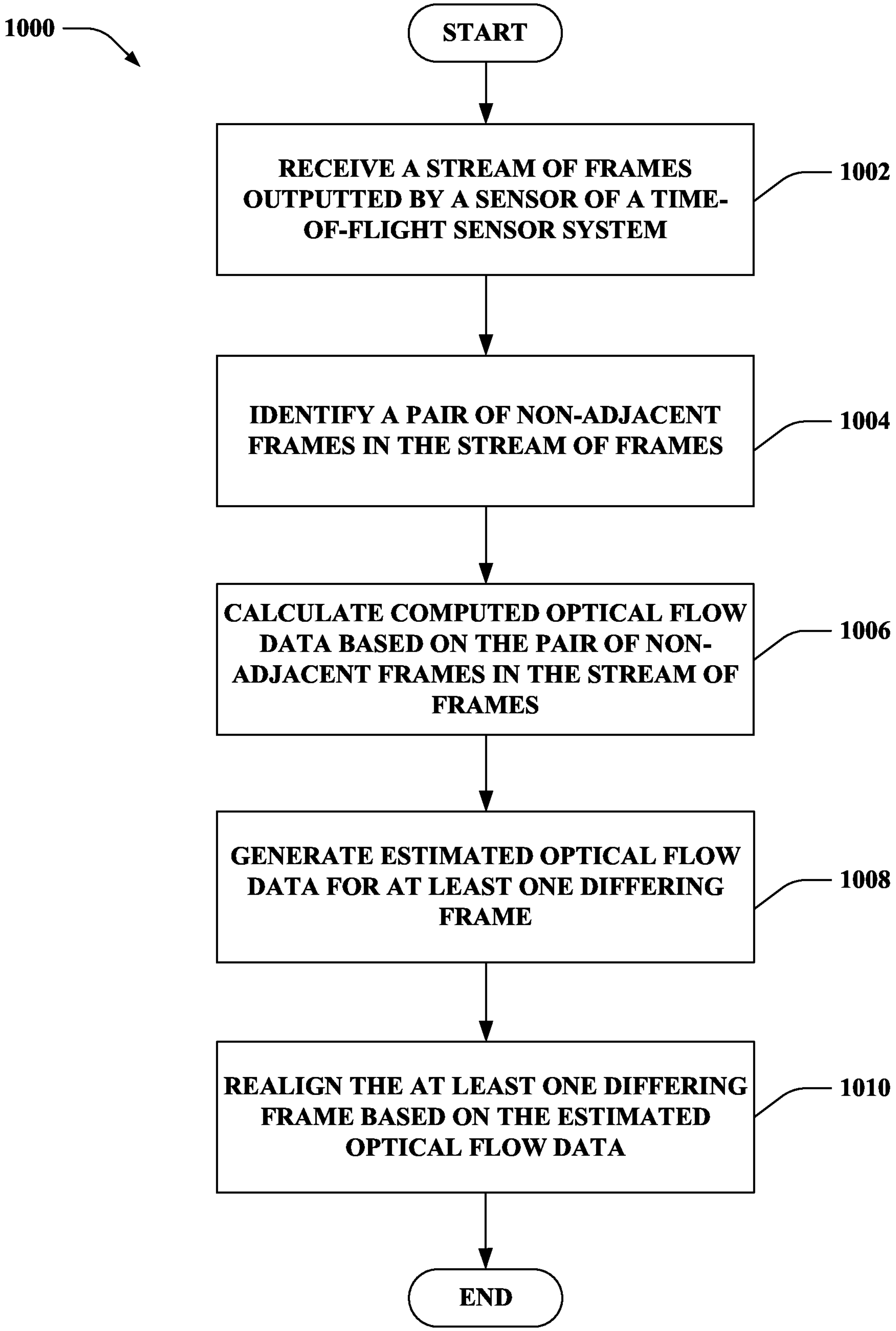
FIG. 10 is a flow diagram that illustrates an exemplary methodology of mitigating motion misalignment of a time-of-flight sensor system.
Figure 11:
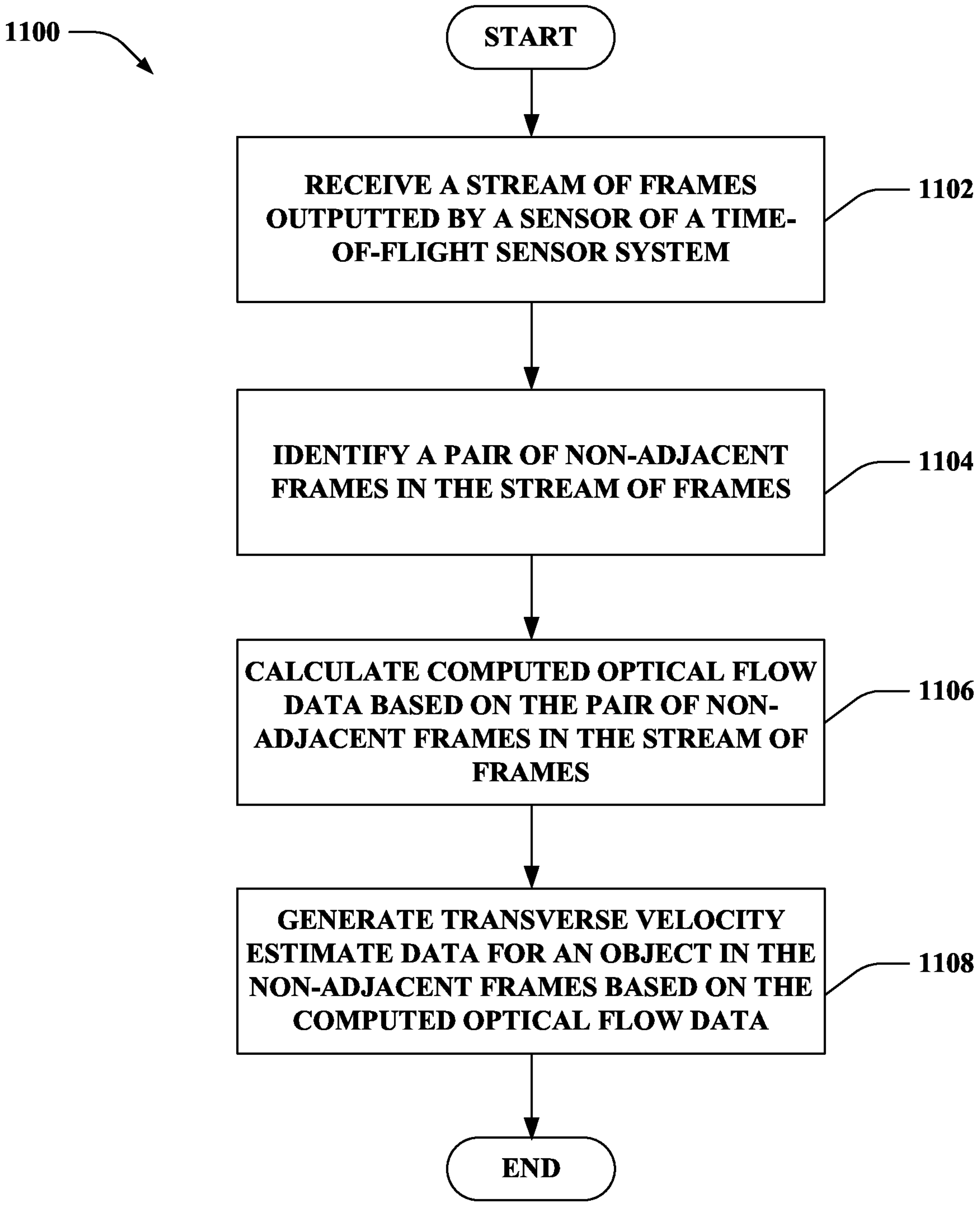
FIG. 11 is a flow diagram that illustrates an exemplary methodology performed by a time-of-flight sensor system.

FIGS. 10-11 illustrate exemplary methodologies relating to operation of a time-of-flight sensor system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 10 illustrates a methodology 1000 of mitigating motion misalignment of a time-of-flight sensor system. At 1002, a stream of frames outputted by a sensor of the time-of-flight sensor system can be received. The stream of frames includes a series of frame sequences. A frame sequence includes a set of frames where the frames in the set have different frame types. A frame type of a frame signifies sensor parameters of the time-of-flight sensor system when the frame is captured by the time-of-flight sensor system such that the differing frame types signify different sensor parameters. At 1004, a pair of non-adjacent frames in the stream of frames can be identified. At 1006, computed optical flow data can be calculated based on the pair of non-adjacent frames in the stream of frames. At 1008, estimated optical flow data for at least one differing frame other than the pair of non-adjacent frames in the stream of frames can be generated based on the computed optical flow data. At 1010, the at least one differing frame can be realigned based on the estimated optical flow data.

In various examples, object depth data can further be computed based on realigned frames in the frame sequence. Moreover, a point cloud including the object depth data can be outputted.

Turning to FIG. 11, illustrated is a methodology 1100 performed by a time-of-flight sensor system. At 1102, a stream of frames outputted by a sensor of the time-of-flight sensor system can be received. The stream of frames includes a series of frame sequences. A frame sequence includes a set of frames where the frames in the set have different frame types. A frame type of a frame signifies sensor parameters of the time-of-flight sensor system when the frame is captured by the time-of-flight sensor system such that the differing frame types signify different sensor parameters. At 1104, a pair of non-adjacent frames in the stream of frames can be identified. At 1106, computed optical flow data can be calculated based on the pair of non-adjacent frames in the stream of frames. At 1108, transverse velocity estimate data for an object in the non-adjacent frames can be generated based on the computed optical flow data.

According to various examples, estimated optical flow data for at least one differing frame other than the pair of non-adjacent frames in the stream of frames can be generated based on the computed optical flow data. Moreover, the at least one differing frame can be realigned based on the estimated optical flow data. Further, object depth data for the object can be computed based on realigned frames in the frame sequence. Thus, the transverse velocity estimate data for the object can further be generated based on the object depth data for the object (in addition to the optical flow data).

Figure 12:
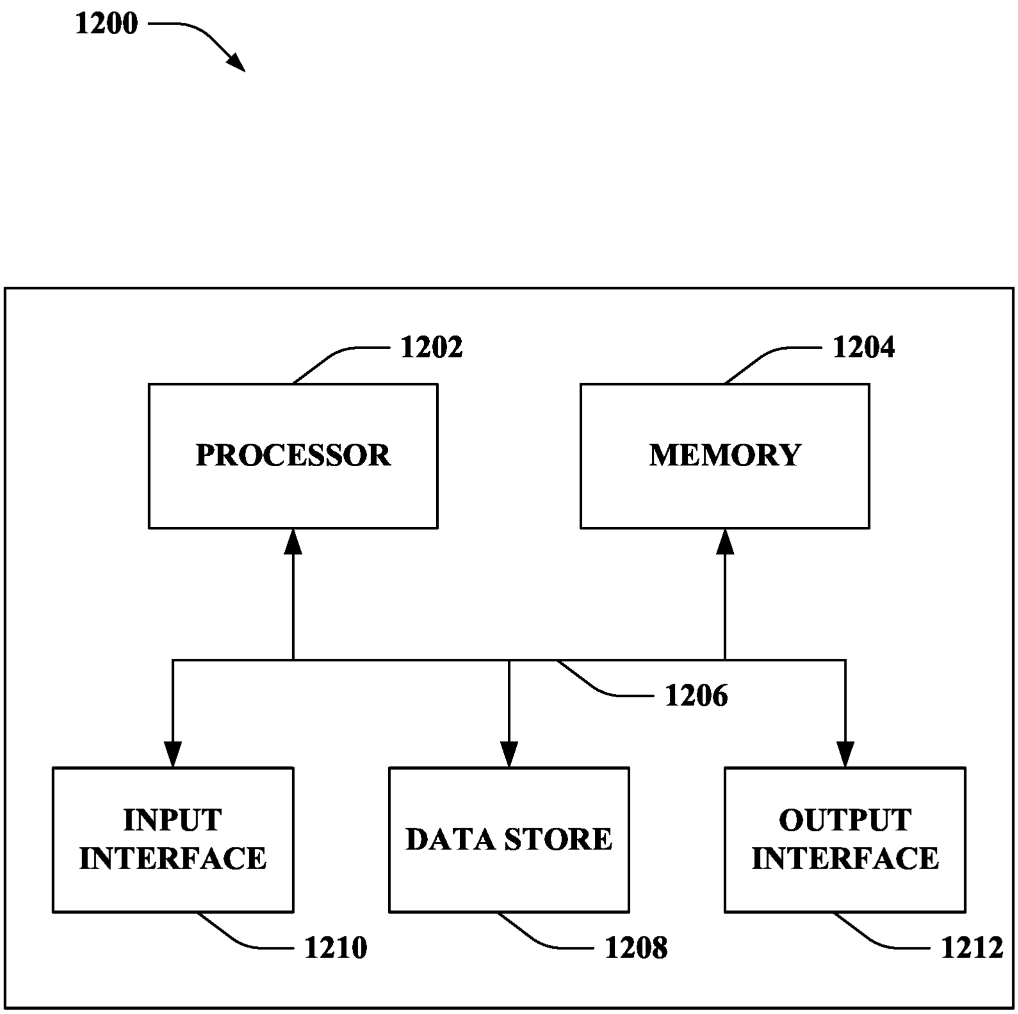
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may be or include the computing system 910. According to another example, the computing device 1200 may be or include the computing system 106. The computing device 1200 includes at least one processor 1202 that executes instructions that are stored in a memory 1204. The instructions may be, for instance, instructions for implementing functionality described as being carried out by one or more systems discussed above or instructions for implementing one or more of the methods described above. The processor 1202 may be a GPU, a plurality of GPUs, a CPU, a plurality of CPUs, a multi-core processor, etc. The processor 1202 may access the memory 1204 by way of a system bus 1206. In addition to storing executable instructions, the memory 1204 may also store frames, timestamps, computed optical flow data, estimated optical flow data, object depth data, point clouds, and so forth.

The computing device 1200 additionally includes a data store 1208 that is accessible by the processor 1202 by way of the system bus 1206. The data store 1208 may include executable instructions, frames, timestamps, computed optical flow data, estimated optical flow data, object depth data, point clouds, etc. The computing device 1200 also includes an input interface 1210 that allows external devices to communicate with the computing device 1200. For instance, the input interface 1210 may be used to receive instructions from an external computer device, etc. The computing device 1200 also includes an output interface 1212 that interfaces the computing device 1200 with one or more external devices. For example, the computing device 1200 may transmit control signals to the vehicle propulsion system 904, the braking system 906, and/or the steering system 908 by way of the output interface 912.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Systems and methods have been described herein in accordance with at least the examples set forth below.

(A1) In one aspect, a computing system including a processor and memory that stores computer-executable instructions that, when executed by the processor, cause the processor to perform acts is described herein. The acts include receiving a stream of frames outputted by a sensor of a time-of-flight sensor system, where the stream of frames includes a series of frame sequences. A frame sequence includes a set of frames where the frames in the set have different frame types, and a frame type of a frame signifies sensor parameters of the time-of-flight sensor system when the frame is captured by the time-of-flight sensor system such that the different frame types signify different sensor parameters. The acts also include identifying a pair of non-adjacent frames in the stream of frames. Moreover, the acts include calculating computed optical flow data based on the pair of non-adjacent frames in the stream of frames. Further, the acts include generating estimated optical flow data for at least one differing frame other than the pair of non-adjacent frames in the stream of frames based on the computed optical flow data. The acts also include realigning the at least one differing frame based on the estimated optical flow data.

(A2) In some embodiments of the computing system of (A1), the acts further include computing object depth data based on realigned frames in the frame sequence, and outputting a point cloud including the object depth data.

(A3) In some embodiments of the computing system of (A2), the set of frames in the frame sequence are captured by the time-of-flight sensor system over a period of time between 1 milliseconds and 100 milliseconds.

(A4) In some embodiments of at least one of the computing systems of (A1)-(A3), the sensor parameters of the time-of-flight sensor system when the frame is captured include at least one of: an illumination state of the time-of-flight sensor system, such that the time-of-flight sensor system either emits or is inhibited from emitting light for the frame; a relative phase delay between a transmitter system and a receiver system of the time-of-flight sensor system for the frame; or an integration time of the sensor of the time-of-flight sensor system for the frame.

(A5) In some embodiments of at least one of the computing systems of (A1)-(A4), generating the estimated optical flow data for the at least one differing frame other than the pair of non-adjacent frames in the stream includes interpolating the estimated optical flow data for at least one intermediate frame between the pair of non-adjacent frames based on the computed optical flow data.

(A6) In some embodiments of at least one of the computing systems of (A1)-(A4), generating the estimated optical flow data for the at least one differing frame other than the pair of non-adjacent frames in the stream includes interpolating the estimated optical flow data for intermediate frames between the pair of non-adjacent frames based on the computed optical flow data.

(A7) In some embodiments of at least one of the computing systems of (A1)-(A4), generating the estimated optical flow data for the at least one differing frame other than the pair of non-adjacent frames in the stream includes extrapolating the estimated optical flow data for at least one successive frame subsequent to the pair of non-adjacent frames based on the computed optical flow data.

(A8) In some embodiments of at least one of the computing systems of (A1)-(A7), the estimated optical flow data for the at least one differing frame is further generated based on timestamp information for the at least one differing frame.

(A9) In some embodiments of at least one of the computing systems of (A1)-(A8), the pair of non-adjacent frames in the stream includes successive frames of the same frame type.

(A10) In some embodiments of at least one of the computing systems of (A1)-(A8), the computed optical flow data is calculated for each pair of non-adjacent frames of the same frame type in successive frame sequences in the stream of frames.

(A11) In some embodiments of at least one of the computing systems of (A1)-(A8), the pair of non-adjacent frames in the stream for which the computed optical flow data is calculated includes successive passive frames for which the time-of-flight sensor system is inhibited from emitting light.

(A12) In some embodiments of at least one of the computing systems of (A1)-(A8), the pair of non-adjacent frames in the stream for which the computed optical flow data is calculated includes successive frames having relative phase delays that are 180 degrees out of phase.

(A13) In some embodiments of at least one of the computing systems of (A1)-(A12), the time-of-flight sensor system includes the computing system.

(A14) In some embodiments of at least one of the computing systems of (A1)-(A13), an autonomous vehicle includes the time-of-flight sensor system and the computing system.

(B1) In another aspect, a method of mitigating motion misalignment of a time-of-flight sensor system is disclosed herein. The method includes receiving a stream of frames outputted by a sensor of the time-of-flight sensor system, the stream of frames includes a series of frame sequences. A frame sequence includes a set of frames where the frames in the set have different frame types, and a frame type of a frame signifies sensor parameters of the time-of-flight sensor system when the frame is captured by the time-of-flight sensor system such that the different frame types signify different sensor parameters. The method also includes identifying a pair of non-adjacent frames in the stream of frames. Further, the method includes calculating computed optical flow data based on the pair of non-adjacent frames in the stream of frames. Moreover, the method includes generating estimated optical flow data for at least one differing frame other than the pair of non-adjacent frames in the stream of frames based on the computed optical flow data. The method also includes realigning the at least one differing frame based on the estimated optical flow data.

(B2) In some embodiments of the method of (B1), the method further includes computing object depth data based on realigned frames in the frame sequence, and outputting a point cloud including the object depth data.

(B3) In some embodiments of at least one of the methods of (B1)-(B2), generating the estimated optical flow data for the at least one differing frame other than the pair of non-adjacent frames in the stream includes interpolating the estimated optical flow data for at least one intermediate frame between the pair of non-adjacent frames based on the computed optical flow data.

(B4) In some embodiments of at least one of the methods of (B1)-(B2), generating the estimated optical flow data for the at least one differing frame other than the pair of non-adjacent frames in the stream includes interpolating the estimated optical flow data for intermediate frames between the pair of non-adjacent frames based on the computed optical flow data.

(B5) In some embodiments of at least one of the methods of (B1)-(B2), generating the estimated optical flow data for the at least one differing frame other than the pair of non-adjacent frames in the stream includes extrapolating the estimated optical flow data for at least one successive frame subsequent to the pair of non-adjacent frames based on the computed optical flow data.

(C1) In another aspect, a time-of-flight sensor system is disclosed herein, where the time-of-flight sensor system includes a receiver system including a sensor and a computing system in communication with the receiver system. The computing system includes a processor and memory that stores computer-executable instructions that, when executed by the processor, cause the processor to perform acts. The acts include receiving a stream of frames outputted by the sensor of the receiver system of the time-of-flight sensor system, the stream of frames includes a series of frame sequences. A frame sequence includes a set of frames where the frames in the set have different frame types, and a frame type of a frame signifies sensor parameters of the time-of-flight sensor system when the frame is captured by the time-of-flight sensor system such that the different frame types signify different sensor parameters. The acts further include identifying a pair of non-adjacent frames in the stream of frames. Moreover, the acts include calculating computed optical flow data based on the pair of non-adjacent frames in the stream of frames. Further, the acts include generating estimated optical flow data for at least one differing frame other than the pair of non-adjacent frames in the stream of frames based on the computed optical flow data. The acts also include realigning the at least one differing frame based on the estimated optical flow data, computing object depth data based on realigned frames in the frame sequence, and outputting a point cloud including the object depth data.

(D1) In another aspect, a computing system is disclosed herein, where the computing system includes a processor and memory that stores computer-executable instructions that, when executed by the processor, cause the processor to perform acts. The acts include receiving a stream of frames outputted by a sensor of a time-of-flight sensor system, the stream of frames includes a series of frame sequences. A frame sequence includes a set of frames where the frames in the set have different frame types, and a frame type of a frame signifies sensor parameters of the time-of-flight sensor system when the frame is captured by the time-of-flight sensor system such that the different frame types signify different sensor parameters. The acts further include identifying a pair of non-adjacent frames in the stream of frames. Moreover, the acts include calculating computed optical flow data based on the pair of non-adjacent frames in the stream of frames. The acts also include generating transverse velocity estimate data for an object in the non-adjacent frames based on the computed optical flow data.

(D2) In some embodiments of the computing system of (D1), the transverse velocity estimate data for the object is further generated based on an area in an environment of the time-of-flight sensor system included in a field of view of the frames.

(D3) In some embodiments of at least one of the computing systems (D1)-(D2), the acts further include generating estimated optical flow data for at least one differing frame other than the pair of non-adjacent frames in the stream of frames based on the computed optical flow data; realigning the at least one differing frame based on the estimated optical flow data; and computing object depth data for the object based on realigned frames in the frame sequence, where the traverse velocity estimate data for the object is further generated based on the object depth data for the object.

(D4) In some embodiments of the computing system of (D3), the set of frames in the frame sequence are captured by the time-of-flight sensor system over a period of time between 1 milliseconds and 100 milliseconds.

(D5) In some embodiments of at least one of the computing systems (D1)-(D4), the sensor parameters of the time-of-flight sensor system when the frame is captured include at least one of: an illumination state of the time-of-flight sensor system, such that the time-of-flight sensor system either emits or is inhibited from emitting light for the frame; a relative phase delay between a transmitter system and a receiver system of the time-of-flight sensor system for the frame; or an integration time of the sensor of the time-of-flight sensor system for the frame.

(D6) In some embodiments of at least one of the computing systems (D1)-(D5), the pair of non-adjacent frames in the stream includes successive frames of the same frame type.

(D7) In some embodiments of at least one of the computing systems (D1)-(D5), the computed optical flow data is calculated for each pair of non-adjacent frames of the same frame type in successive frame sequences in the stream of frames.

(D8) In some embodiments of at least one of the computing systems (D1)-(D5), the pair of non-adjacent frames in the stream for which the computed optical flow data is calculated includes successive passive frames for which the time-of-flight sensor system is inhibited from emitting light.

(D9) In some embodiments of at least one of the computing systems (D1)-(D5), the pair of non-adjacent frames in the stream for which the computed optical flow data is calculated includes successive frames having relative phase delays that are 180 degrees out of phase.

(D10) In some embodiments of at least one of the computing systems (D1)-(D9), the time-of-flight sensor system includes the computing system.

(D11) In some embodiments of at least one of the computing systems (D1)-(D10), an autonomous vehicle includes the time-of-flight sensor system and the computing system.

(E1) In another aspect, a method performed by a time-of-flight sensor system is disclosed herein. The method includes receiving a stream of frames outputted by a sensor of the time-of-flight sensor system, the stream of frames includes a series of frame sequences. A frame sequence includes a set of frames where the frames in the set have different frame types, and a frame type of a frame signifies sensor parameters of the time-of-flight sensor system when the frame is captured by the time-of-flight sensor system such that the different frame types signify different sensor parameters. Moreover, the method includes identifying a pair of non-adjacent frames in the stream of frames. Further, the method includes calculating computed optical flow data based on the pair of non-adjacent frames in the stream of frames. The method also includes generating transverse velocity estimate data for an object in the non-adjacent frames based on the computed optical flow data.

(E2) In some embodiments of the method of (E1), the transverse velocity estimate data for the object is further generated based on an area in an environment of the time-of-flight sensor system included in a field of view of the frames.

(E3) In some embodiments of at least one of the methods of (E1)-(E2), the method further includes generating estimated optical flow data for at least one differing frame other than the pair of non-adjacent frames in the stream of frames based on the computed optical flow data; realigning the at least one differing frame based on the estimated optical flow data; and computing object depth data for the object based on realigned frames in the frame sequence, where the traverse velocity estimate data for the object is further generated based on the object depth data for the object.

(E4) In some embodiments of at least one of the methods of (E1)-(E3), the sensor parameters of the time-of-flight sensor system when the frame is captured include: an illumination state of the time-of-flight sensor system, such that the time-of-flight sensor system either emits or is inhibited from emitting light for the frame; a relative phase delay between a transmitter system and a receiver system of the time-of-flight sensor system for the frame; and an integration time of the sensor of the time-of-flight sensor system for the frame.

(E5) In some embodiments of at least one of the methods of (E1)-(E4), the pair of non-adjacent frames in the stream includes successive frames of the same frame type.

(E6) In some embodiments of at least one of the methods of (E1)-(E4), the computed optical flow data is calculated for each pair of non-adjacent frames of the same frame type in successive frame sequences in the stream of frames.

(E7) In some embodiments of at least one of the methods of (E1)-(E4), the pair of non-adjacent frames in the stream for which the computed optical flow data is calculated includes successive passive frames for which the time-of-flight sensor system is inhibited from emitting light.

(E8) In some embodiments of at least one of the methods of (E1)-(E4), the pair of non-adjacent frames in the stream for which the computed optical flow data is calculated includes successive frames having relative phase delays that are 180 degrees out of phase.

(F1) In another aspect, a time-of-flight sensor system is disclosed herein, where the time-of-flight sensor system includes a receiver system including a sensor and a computing system in communication with the receiver system. The computing system includes a processor and memory that stores computer-executable instructions that, when executed by the processor, cause the processor to perform acts. The acts include receiving a stream of frames outputted by the receiver system of the time-of-flight sensor system, the stream of frames includes a series of frame sequences. A frame sequence includes a set of frames where the frames in the set have different frame types, and a frame type of a frame signifies sensor parameters of the time-of-flight sensor system when the frame is captured by the time-of-flight sensor system such that the different frame types signify different sensor parameters. The acts also include identifying a pair of non-adjacent frames in the stream of frames. Moreover, the acts include calculating computed optical flow data based on the pair of non-adjacent frames in the stream of frames. The acts further include generating estimated optical flow data for at least one differing frame other than the pair of non-adjacent frames in the stream of frames based on the computed optical flow data. The acts further include realigning the at least one differing frame based on the estimated optical flow data. The acts also include computing object depth data for an object based on realigned frames in the frame sequence. Moreover, the acts include generating transverse velocity estimate data for the object based on the computed optical flow data and the object depth data for the object.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:

a processor; and memory that stores computer-executable instructions that, when executed by the processor, cause the processor to perform acts comprising:

receiving a stream of frames outputted by a sensor of a time-of-flight sensor system, the stream of frames comprises a series of frame sequences, wherein a frame sequence comprises a set of frames where the frames in the set have different frame types, and wherein a frame type of a frame signifies sensor parameters of the time-of-flight sensor system when the frame is captured by the time-of-flight sensor system such that the different frame types signify different sensor parameters;

identifying a pair of non-adjacent successive passive frames for which the time-of-flight sensor system is inhibited from emitting light in the stream of frames;

calculating computed optical flow data based on the pair of non-adjacent frames in the stream of frames;

generating estimated optical flow data for at least one differing frame other than the pair of non-adjacent frames in the stream of frames based on the computed optical flow data; and realigning the at least one differing frame based on the estimated optical flow data.

2. The computing system of claim 1, the acts further comprising:

computing object depth data based on realigned frames in the frame sequence; and outputting a point cloud comprising the object depth data.

3. The computing system of claim 2, wherein the set of frames in the frame sequence are captured by the time-of-flight sensor system over a period of time between 1 milliseconds and 100 milliseconds.

4. The computing system of claim 1, wherein the sensor parameters of the time-of-flight sensor system when the frame is captured comprise at least one of:

an illumination state of the time-of-flight sensor system, such that the time-of-flight sensor system either emits or is inhibited from emitting light for the frame;

a relative phase delay between a transmitter system and a receiver system of the time-of-flight sensor system for the frame; or an integration time of the sensor of the time-of-flight sensor system for the frame.

5. The computing system of claim 1, wherein generating the estimated optical flow data for the at least one differing frame other than the pair of non-adjacent frames in the stream comprises interpolating the estimated optical flow data for at least one intermediate frame between the pair of non-adjacent frames based on the computed optical flow data.

6. The computing system of claim 1, wherein generating the estimated optical flow data for the at least one differing frame other than the pair of non-adjacent frames in the stream comprises interpolating the estimated optical flow data for intermediate frames between the pair of non-adjacent frames based on the computed optical flow data.

7. The computing system of claim 1, wherein generating the estimated optical flow data for the at least one differing frame other than the pair of non-adjacent frames in the stream comprises extrapolating the estimated optical flow data for at least one successive frame subsequent to the pair of non-adjacent frames based on the computed optical flow data.

8. The computing system of claim 1, wherein the estimated optical flow data for the at least one differing frame is further generated based on timestamp information for the at least one differing frame.

9. The computing system of claim 1, wherein the pair of non-adjacent frames in the stream comprises successive frames of the same frame type.

10. The computing system of claim 1, wherein the computed optical flow data is calculated for each pair of non-adjacent frames of the same frame type in successive frame sequences in the stream of frames.

11. The computing system of claim 1, wherein the pair of non-adjacent frames in the stream for which the computed optical flow data is calculated comprises successive frames having relative phase delays that are 180 degrees out of phase.

12. The computing system of claim 1, wherein the time-of-flight sensor system comprises the computing system.

13. The computing system of claim 1, wherein an autonomous vehicle comprises the time-of-flight sensor system and the computing system.

14. A method of mitigating motion misalignment of a time-of-flight sensor system, comprising:

receiving a stream of frames outputted by a sensor of the time-of-flight sensor system, the stream of frames comprises a series of frame sequences, wherein a frame sequence comprises a set of frames where the frames in the set have different frame types, and wherein a frame type of a frame signifies sensor parameters of the time-of-flight sensor system when the frame is captured by the time-of-flight sensor system such that the different frame types signify different sensor parameters;

identifying a pair of non-adjacent successive passive frames for which the time-of-flight sensor system is inhibited from emitting light in the stream of frames;

calculating computed optical flow data based on the pair of non-adjacent frames in the stream of frames;

generating estimated optical flow data for at least one differing frame other than the pair of non-adjacent frames in the stream of frames based on the computed optical flow data; and realigning the at least one differing frame based on the estimated optical flow data.

15. The method of claim 14, further comprising:

computing object depth data based on realigned frames in the frame sequence; and outputting a point cloud comprising the object depth data.

16. The method of claim 14, wherein generating the estimated optical flow data for the at least one differing frame other than the pair of non-adjacent frames in the stream comprises interpolating the estimated optical flow data for at least one intermediate frame between the pair of non-adjacent frames based on the computed optical flow data.

17. The method of claim 14, wherein generating the estimated optical flow data for the at least one differing frame other than the pair of non-adjacent frames in the stream comprises interpolating the estimated optical flow data for intermediate frames between the pair of non-adjacent frames based on the computed optical flow data.

18. The method of claim 14, wherein generating the estimated optical flow data for the at least one differing frame other than the pair of non-adjacent frames in the stream comprises extrapolating the estimated optical flow data for at least one successive frame subsequent to the pair of non-adjacent frames based on the computed optical flow data.

19. A time-of-flight sensor system, comprising:

a receiver system comprising a sensor; and a computing system in communication with the receiver system, comprising: a processor; and memory that stores computer-executable instructions that, when executed by the processor, cause the processor to perform acts comprising: receiving a stream of frames outputted by the sensor of the receiver system of the time-of-flight sensor system, the stream of frames comprises a series of frame sequences, wherein a frame sequence comprises a set of frames where the frames in the set have different frame types, and wherein a frame type of a frame signifies sensor parameters of the time-of-flight sensor system when the frame is captured by the time-of-flight sensor system such that the different frame types signify different sensor parameters;

identifying a pair of non-adjacent successive passive frames for which the time-of-flight sensor system is inhibited from emitting light in the stream of frames;

calculating computed optical flow data based on the pair of non-adjacent frames in the stream of frames;

generating estimated optical flow data for at least one differing frame other than the pair of non-adjacent frames in the stream of frames based on the computed optical flow data;

realigning the at least one differing frame based on the estimated optical flow data;

computing object depth data based on realigned frames in the frame sequence; and outputting a point cloud comprising the object depth data.

* * * * *